US012744297B2

(12) United States Patent
Şişman et al.

(10) Patent No.: US 12,744,297 B2
(45) Date of Patent: Sep. 22, 2026

(54) IRIS WAVEGUIDE SWITCH

(71) Applicant: Profen Iletişim Teknolojileri Ve Hizmetleri Sanayi Ticaret Anonim Şirketi, Şişli (TR)

(72) Inventors: Ismail Şişman, Şişli (TR); Merve Güvenç, Şişli (TR)

( * ) Notice: Subject to any disclaimer, the term of this patent is extended or adjusted under 35 U.S.C. 154(b) by 148 days.

(21) Appl. No.: 18/523,096

(22) Filed: Nov. 29, 2023

(65) Prior Publication Data

US 2025/0015475 A1 Jan. 9, 2025

(30) Foreign Application Priority Data

Jul. 5, 2023 (TR) ................................ 2023/007859

(51) Int. Cl.
*H01P 5/12* (2006.01)
*H01P 1/02* (2006.01)

(52) U.S. Cl.
CPC . *H01P 5/12* (2013.01); *H01P 1/02* (2013.01)

(58) Field of Classification Search
CPC ............... H01P 5/12; H01P 1/02; H01P 1/122
See application file for complete search history.

(56) References Cited

U.S. PATENT DOCUMENTS 4,242,652 A * 12/1980 Shishido ................. H01P 1/122 333/108
2020/0161730 A1* 5/2020 Hollenbeck ............. H01P 1/122

FOREIGN PATENT DOCUMENTS

EP 0147610 A2 * 7/1985 .............. H01P 1/122
TR 96/00161 B 2/1996

* cited by examiner

*Primary Examiner* — Andrea Lindgren Baltzell
*Assistant Examiner* — Kimberly E Glenn
(74) *Attorney, Agent, or Firm* — Egbert, McDaniel & Swartz, PLLC

(57) ABSTRACT

Disclosed is an iris waveguide switch capable of efficiently transmitting and switching a signal between two desired inputs and two desired outputs in high power applications, which is generally used in various applications such as millimeter wave radar, satellite systems and RF test setup. The iris waveguide switch includes two main parts: an inner cylinder and an outer cube. Periodic irises prevent the signal propagating through the gap between the inner cylinder and the outer cube to the side surface of the inner cylinder, guiding the signal into the inner cylinder bend. The inner cylinder, rotated by a drive mechanism, switches the incoming signal between two inputs and two outputs.

2 Claims, 3 Drawing Sheets

IRIS WAVEGUIDE SWITCH

FIELD OF THE INVENTION

The invention relates to an iris waveguide switch capable of efficiently transmitting and switching a signal between two desired inputs and two desired outputs in high power applications, often used in various applications such as millimeter wave radar, satellite systems and RF test setup.

BACKGROUND OF THE INVENTION

Application TR 96/00161 in the state of the art relates to a structure in which a signal can be switched between two inputs and two outputs. The two transmission paths are the segment in which the signal travels between the two inputs and the two outputs. By rotating the transmission path, the output connected to the input via the transmission path changes. Thus, switching is performed and the transmission of the signal is controlled. Although waveguide switches have good electrical performance metrics in high power applications, they require precision manufacturing techniques with high realization costs. As the frequency increases, the size of the switch decreases in direct proportion to the wavelength. This makes manufacturing difficult and increases the manufacturing cost.

As a result, due to the above-mentioned drawbacks and the inadequacy of the existing solutions on the subject, it was considered necessary to make an improvement in the relevant technical field.

BRIEF SUMMARY OF THE INVENTION

In the invention, production in two parts without the need for physical contact with the iris waveguide technology reduces the production and integration costs of microwave circuit elements. In the invention, iris waveguide technology has been used due to the convenience it provides in design and production steps.

The iris waveguide switch comprises two parts, the inner cylinder and the outer cube. The structure switches two inputs and two outputs to each other, this working principle is called double-pole double-throw. The rotating inner cylinder structure is used to achieve transmission and switching. In the iris waveguide technology, the periodic structures limit the transmission of the signal in unwanted regions. This periodic structure is called iris. Thanks to the irises on the inner cylinder, the signal is transmitted to the waveguide processed into the inner cylinder without spreading into the gap between the outer cube and the inner cylinder. In this way, the signal transmission between the two non-contact parts is lossless.

The structural and characteristic features and all advantages of the invention is more clearly understood by means of the following figures and the detailed description with reference to these figures.

Figure 1:
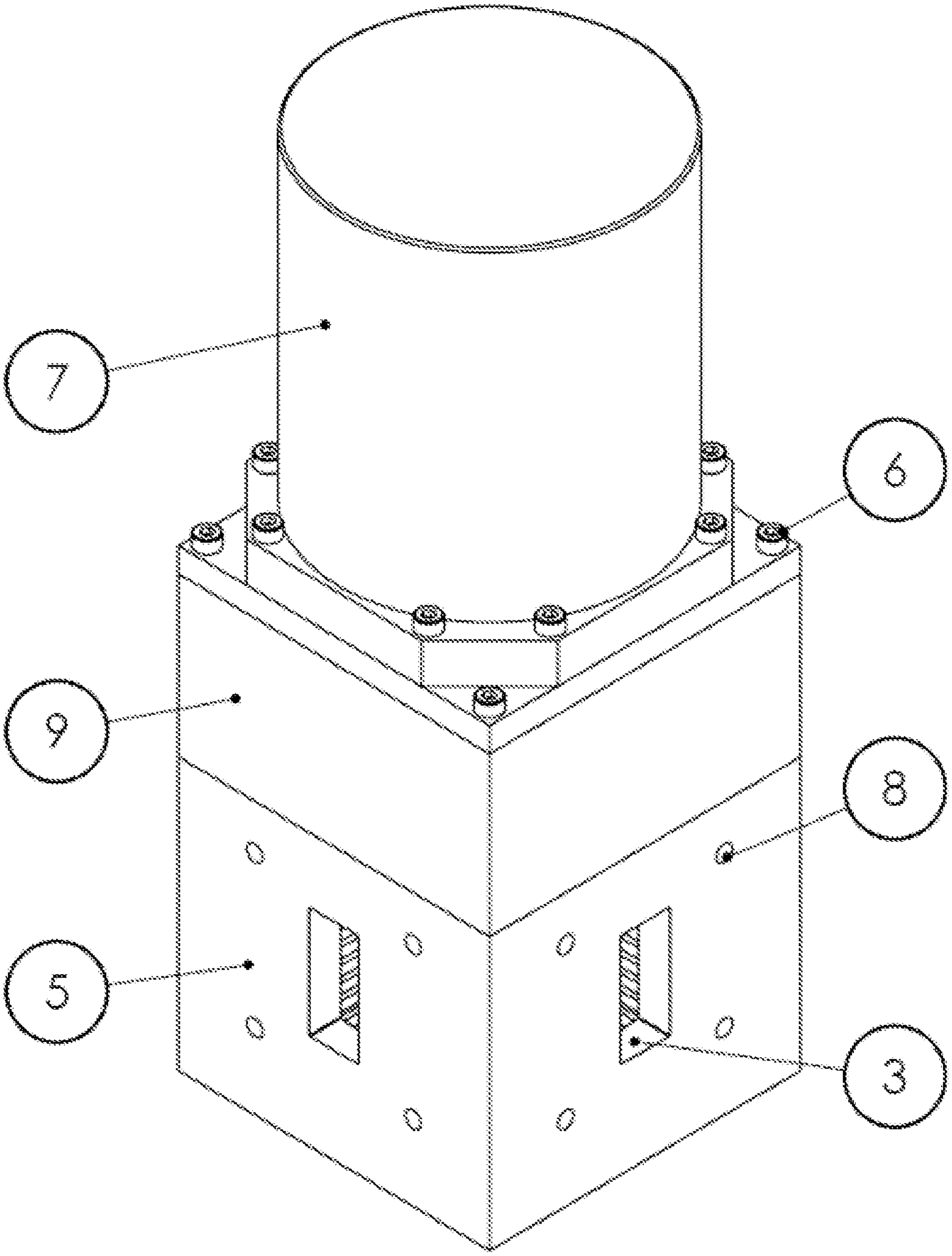
FIG. 1 is a perspective view of the inventive iris waveguide switch.
Figure 2:
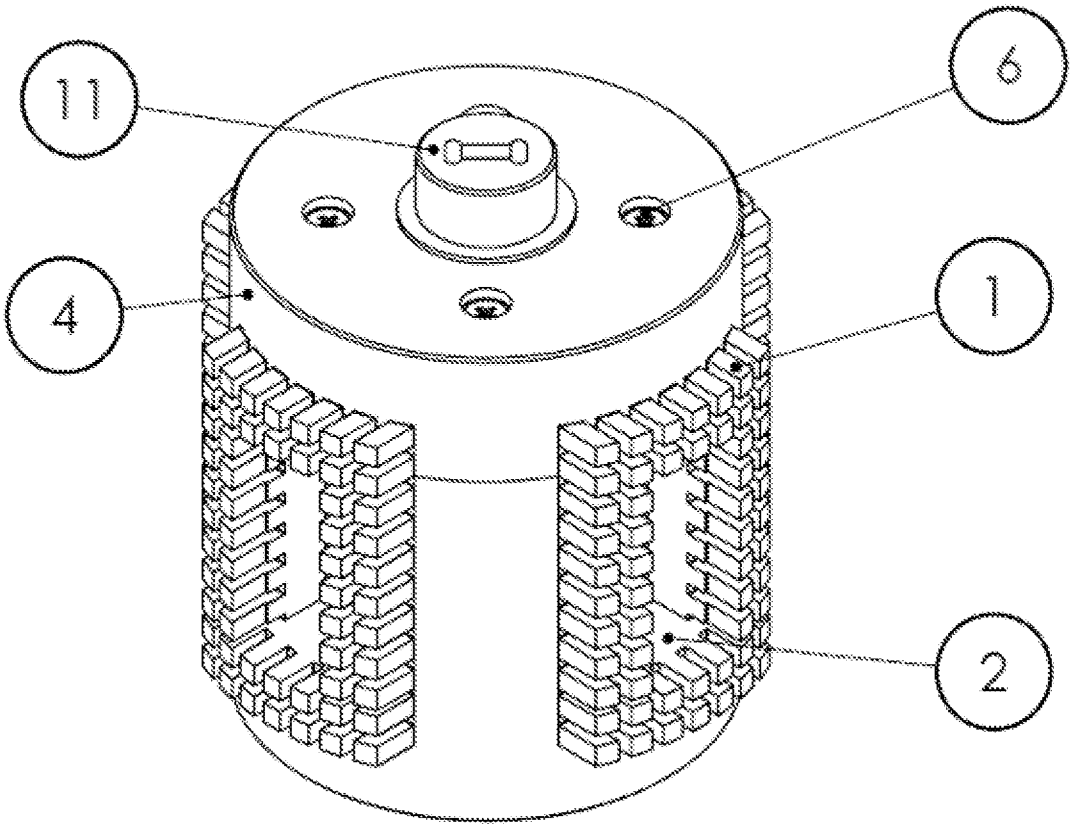
FIG. 2 is a perspective view of the inner cylinder, which is one of the main parts forming the inventive iris waveguide switch.
Figure 3:
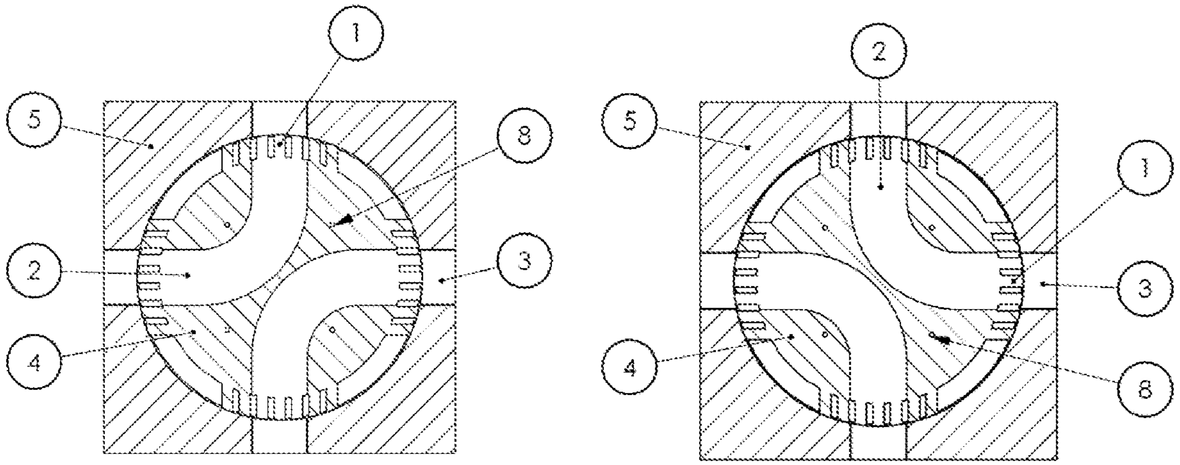
FIG. 3 shows the ports which are combined with respect to the movement of the inner cylinder.
Figure 4:
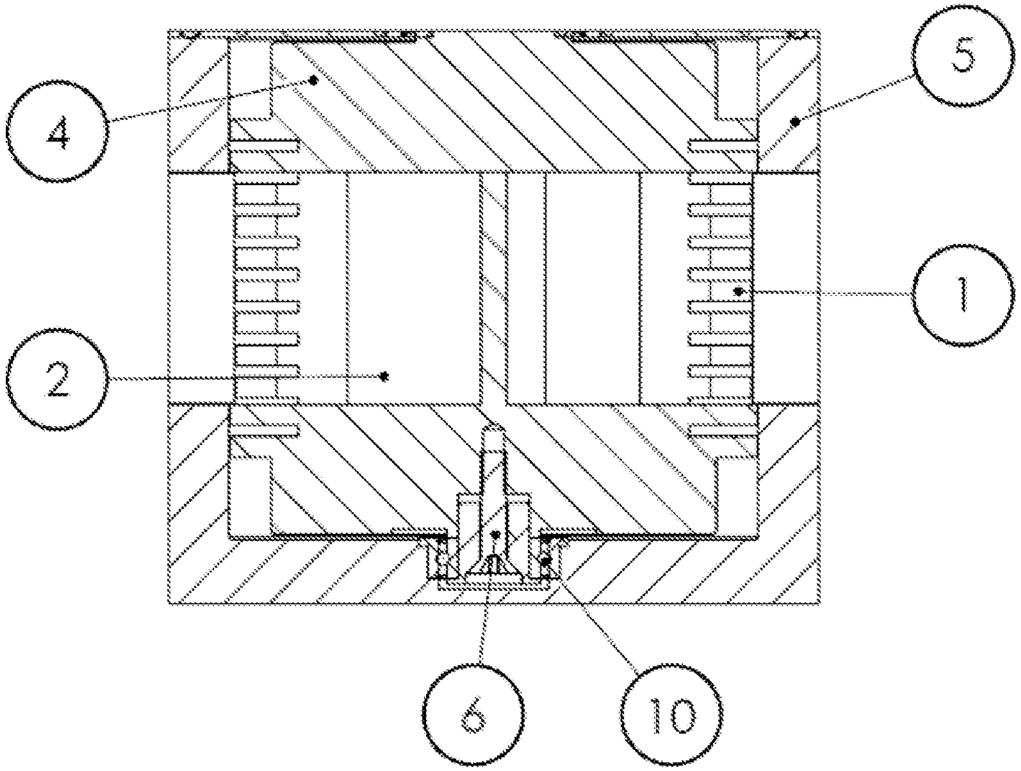
FIG. 4 is a sectional view of the inventive iris waveguide switch.

The drawings are not necessarily to scale and may omit details that are not necessary to understand the present invention.

DESCRIPTION OF PART REFERENCES

1. Iris
2. Inner cylinder bend
3. Port
4. Inner cylinder
5. Outer cube
6. Connection element
7. Sealing cover
8. Mounting hole
9. Intermediate section
10. Bearing
11. Drive housing

DETAILED DESCRIPTION OF THE INVENTION

In this detailed description, the preferred structuring of the invention are described solely for the purpose of a better understanding of the subject matter and without any limiting effect.

The iris waveguide switch according to the invention comprises two main parts: an inner cylinder (4) and an outer cube (5). The inner cylinder (4) is rotated to switch the incoming signal between two inputs and two outputs. The signal enters and exits the switch from the outer cube (5). There are four ports (3) on the outer cube (5), which surrounds the inner cylinder (4) and fixes the inputs and outputs of the inner cylinder (4). Mounting holes (8) allow the port (3) inputs to be connected to the outer cube (5). The signal travelling through the transmission line on the outer cube (5) passes to the inner cylinder (4). There are inner cylinder bends (2) into the inner cylinder (4) for the propagation of the signal. The inner cylinder (4) is in two section and the sections are fixed to each other with connection elements (6) such as bolts etc. In order to ensure rotation of the inner cylinder (4), bearings (10) are attached to the top and bottom of the inner cylinder (4). The bearing (10) is fixed by compression method by resting on the steps in the lower and upper parts of the inner cylinder (4).

In order for the inner cylinder (4) to rotate, there is a gap between the outer cube (5) and the inner cylinder (4). The radius of this gap is equal to the space that allows the inner cylinder (4) to rotate in the outer cube (5). In order that the signal is not scattered from this gap to the side surface of the inner cylinder (4), irises (1) designed based on iris waveguide technology are used on the side surface of the inner cylinder (4). The irises (1) prevent the signal propagating through the gap between the inner cylinder (4) and the outer cube (5) to the side surface of the inner cylinder (4) and direct the signal into the inner cylinder bend (2). The signal coming to the inner cylinder (4) reaches the other output by the inner cylinder bend (2). The switching mechanism of the iris waveguide switch is provided by the motor and drive mechanism on the switch. The sealing cover (7) protects the motor switching the inner cylinder (4) from moisture and dust. The sealing cover (7) and the intermediate section (9) containing the drive mechanism are fixed with connection elements (6) such as bolts. The intermediate section (9) protects the drive mechanism which switches the inner cylinder (4). The drive mechanism is connected to the drive housing (11). The drive mechanism ensures 90° rotation of the drive housing (11) and the inner cylinder (4) connected to the drive housing and limits the movement of the inner cylinder (4) outside 90°. When the inner cylinder (4) rotates, the transmission path changes direction, and the signal is transmitted to another output. Thus, the signal is transmitted between two parts that are not in physical contact with each other.

The invention claimed is:

1. A waveguide switch comprising:

an inner cylinder adapted to switch an incoming signal by rotation between a pair of inputs and a pair of outputs, said inner cylinder having a first inner cylinder bend and a second inner cylinder bend machined therein and adapted to selectively allow propagation of the incoming signal between the pair of inlets and pair of outlets;

an outer cube enclosing said inner cylinder, said outer cube fixing a position of the pair of inlets and a pair of outlets of said inner cylinder, said outer cube having four ports formed therein and adapted to align with the first inner cylinder bend and the second inner cylinder bend of said inner cylinder, the four ports comprising a pair of inputs and a pair of outputs, the incoming signal entering at least one of the pair of inputs and exiting at least one of the pair of outlets; and a plurality of irises positioned on an outer side of said inner cylinder and adapted to prevent the propagation of the incoming signal from a gap between said inner cylinder and said outer cube to a side surface of said inner cylinder and adapted to direct the incoming signal to at least one of the first inner cylinder bend of the second inner cylinder bend.

2. The waveguide switch of claim 1, further comprising:

a motor drivingly connected to said inner cylinder so as to rotate said inner cylinder for switching; and a sealing cover positioned around said motor and adapted to prevent said motor from dust and moisture.

* * * * *